(12) United States Patent
Harrington

(10) Patent No.: US 8,138,890 B2
(45) Date of Patent: Mar. 20, 2012

(54) HYBRID ULTRASONIC AND RADIO FREQUENCY IDENTIFICATION SYSTEM AND METHOD

(75) Inventor: Nathan John Harrington, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 12/118,156

(22) Filed: May 9, 2008

(65) Prior Publication Data

US 2009/0278661 A1 Nov. 12, 2009

(51) Int. Cl.
*H04Q 5/22* (2006.01)
*G10K 11/00* (2006.01)

(52) U.S. Cl. ...................... 340/10.1; 367/197
(58) Field of Classification Search ............ 367/197, 367/199
See application file for complete search history.

(56) References Cited

U.S. PATENT DOCUMENTS

| | | | | |
|---|---|---|---|---|
| 3,666,094 A | * | 5/1972 | Martin | 209/590 |
| 4,413,254 A | * | 11/1983 | Pinneo et al. | 340/572.6 |
| 5,300,875 A | | 4/1994 | Tuttle | |
| 5,563,583 A | * | 10/1996 | Brady et al. | 340/572.2 |
| 5,604,486 A | * | 2/1997 | Lauro et al. | 340/10.3 |
| 5,939,984 A | * | 8/1999 | Brady et al. | 340/572.1 |
| 6,154,137 A | * | 11/2000 | Goff et al. | 340/572.4 |
| 6,373,387 B1 | * | 4/2002 | Qiu et al. | 340/572.1 |
| 6,531,957 B1 | | 3/2003 | Nysen | |
| 6,646,554 B1 | * | 11/2003 | Goff et al. | 340/572.6 |
| 7,123,129 B1 | * | 10/2006 | Schrott et al. | 340/10.1 |
| 2006/0065489 A1 | | 3/2006 | Oh | |
| 2007/0139165 A1 | | 6/2007 | Liu | |

OTHER PUBLICATIONS

Block, Ryan; Mitsubishi's smart RFID-enabled elevators, posted Dec. 29, 2004, Weblogs, Inc.

* cited by examiner

*Primary Examiner* — Daniel Wu
*Assistant Examiner* — John Bamert
(74) *Attorney, Agent, or Firm* — Yudell Isidore Ng Russell PLLC

(57) ABSTRACT

A radio frequency identification system and method includes a tag reader and radio frequency identification tag. The tag reader includes an ultrasonic transducer capable of transmitting tones at selected ultrasonic frequencies and a radio transmitter capable of transmitting signals at selected radio frequencies. The tag reader includes a radio receiver capable of receiving signals at selected radio frequencies. The tag reader determines if a received radio frequency signal is modulated at a selected ultrasonic frequency. The radio frequency identification tag includes an array of combination resonator/reflectors. Each combination resonator/reflector of the array includes an ultrasonic resonator coupled to a radio reflector. Each resonator/reflector of the array is tuned to a unique pair of selected ultrasonic frequencies and selected radio frequencies.

9 Claims, 4 Drawing Sheets

|  | 300 GHz | 310 GHz | 320 GHz | 330 GHz | 340 GHz | 350 GHz | 360 GHz | 370 GHz | 380 GHz | 390 GHz | 400 GHz | 410 GHz | 420 GHz | 430 GHz | 440 GHz | 450 GHz | 460 GHz |
|---|---|---|---|---|---|---|---|---|---|---|---|---|---|---|---|---|---|
| 45 KHz | | | | | | | | | | | | | | | | | |
| 50 KHz | | | | | | | | | | | | | | | | | |
| 55 KHz | | | | | | | | | | | | | | | | | |
| 60 KHz | | | | | | | | | | | | | | | | | |
| 65 KHz | | | | | | | | | | | | | | | | | |
| 70 KHz | | | | | | | | | | | | | | | | | |
| 75 KHz | | | | | | | | | | | | | | | | | |
| 80 KHz | | | | | | | | | | | | | | | | | |
| 85 KHz | | | | | | | | | | | | | | | | | |
| 90 KHz | | | | | | | | | | | | | | | | | |
| 95 KHz | | | | | | | | | | | | | | | | | |
| 100 KHz | | | | | | | | | | | | | | | | | |
| 105 KHz | | | | | | | | | | | | | | | | | |
| 110 KHz | | | | | | | | | | | | | | | | | |
| 115 KHz | | | | | | | | | | | | | | | | | |
| 120 KHz | | | | | | | | | | | | | | | | | |
| 125 KHz | | | | | | | | | | | | | | | | | |

FIG. 4

HYBRID ULTRASONIC AND RADIO FREQUENCY IDENTIFICATION SYSTEM AND METHOD

BACKGROUND OF THE INVENTION

1. Technical Field

The present invention relates generally to the field of identification systems, and more particularly to a hybrid ultrasonic and radio frequency identification system and method.

2. Description of the Related Art

Radio frequency identification (RFID) is a common means for identifying and providing information about articles. An RFID system includes a reader device and an RFID tag. RFID readers are typically handheld devices. Some cellular telephones include RFID readers. RFID readers direct signals at the RFID tag and receive and decode signals received from the RFID tag.

RFID tags are typically small flat devices that are affixed to the articles they identify. Despite their small size, current RFID tags are relatively complicated devices. Most RFID tags include an integrated circuit and an antenna. The integrated circuit includes memory for storing information, a small processor, and circuitry for modulating and demodulating a radio frequency signal. The antenna receives and transmits signals.

RFID tags may be passive, active, or semi-passive. Passive RFID tags have no internal power supply. Rather, a passive RFID tags is powered by a small current induced in its antenna by the signal transmitted by the RFID reader. Most passive tags signal by backscattering the carrier wave from the reader. An active RFID tags has an internal power source that it uses to power its integrated circuit and to broadcast a response signal to the reader. Active RFID tags tend to be more reliable than passive RFID tags. Semi-passive RFID tags are similar to active tags in that they have their own power sources, but the power source is used only to power the integrated circuit and not to power the broadcast response signal. The response signal is powered by backscattering the radio frequency energy from the reader.

SUMMARY OF THE INVENTION

The present invention provides a radio frequency identification system and method. Embodiments of the system include a tag reader and radio frequency identification tag. The tag reader includes an ultrasonic transducer capable of transmitting tones at selected ultrasonic frequencies and a radio transmitter capable of transmitting signals at selected radio frequencies. The tag reader includes a radio receiver capable of receiving signals at selected radio frequencies and means for determining if a received radio frequency signal is modulated at a selected ultrasonic frequency. The radio frequency identification tag includes an array of combination resonator/reflectors. Each combination resonator/reflector of the array includes an ultrasonic resonator coupled to a radio reflector. Each resonator/reflector of the array is tuned to a unique pair of selected ultrasonic frequencies and selected radio frequencies.

Embodiments of the system step the radio transmitter through a plurality of selected radio frequencies. The system steps the ultrasonic transducer through a plurality of selected tones at each of the selected radio frequencies. The system steps the radio receiver through the plurality of selected radio frequencies. In some embodiments, the selected radio frequencies range from about 300 GHz to about 460 GHz and the selected ultrasonic frequencies range from about 45 KHz to about 125 KHz.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 4 is an embodiment of a table of frequencies according to the present invention; and, FIG. 5 is a flow chart of an embodiment of processing according to the present invention.

DETAILED DESCRIPTION OF THE PREFERRED EMBODIMENT

Figure 1:
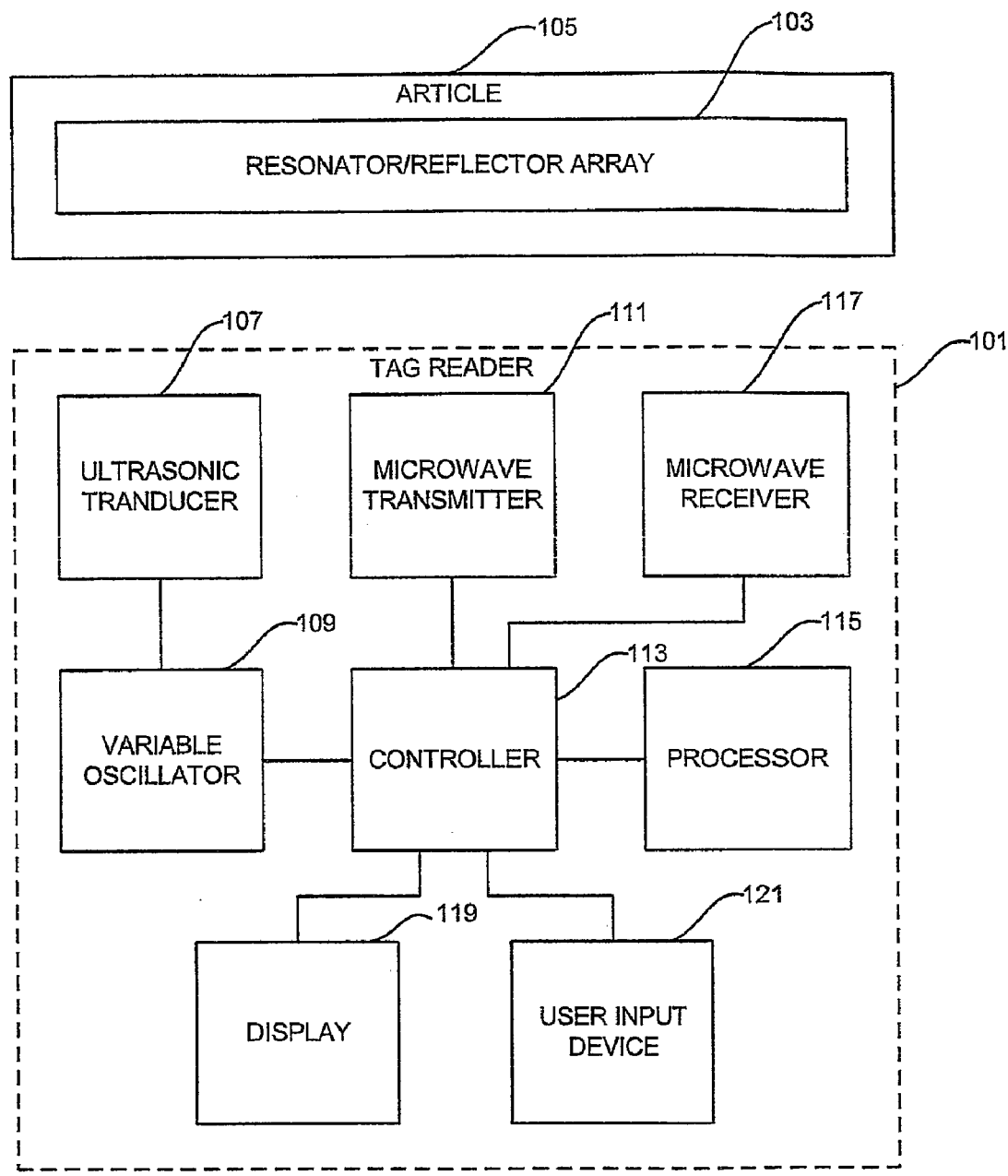
FIG. 1 is a block diagram of an embodiment of a system according to the present invention.

Referring now to the drawings, and first to FIG. 1, an embodiment of a system according to the present invention includes a tag reader 101 and a radio frequency identification tag in the form of a resonator/reflector array 103. The structure and operation of resonator reflector array 103 will be described in detail hereinafter. Resonator reflector array 103 is associated with an article 105. Article 105 may be any physical item that may be identified by resonator reflector array 103. Typically, resonator reflector array 103 is associated with article 105 by attaching or affixing it to the article.

Tag reader 101 includes an ultrasonic transducer 107, which is driven by a variable oscillator 109. In the illustrated embodiment, ultrasonic transducer 107 is adapted to produce ultrasonic tones having frequencies ranging from about 45 kHz to about 130 kHz. Tag reader 101 also includes a microwave transmitter 111. Microwave transmitter 111 is adapted to produce radio frequency signals ranging from about 300 GHz to about 460 GHz, which corresponds to a range of wavelengths from about 1 mm to about 0.7 mm. Variable oscillator 109 and microwave transmitter 111 are operated by a controller 113, which is controlled by a processor 115 programmed according to the present invention. A microwave receiver 117 is coupled to controller 113. Tag reader 101 preferably includes a display 119, which may be an LED display or the like, and the user input device 121, which may be a keypad or touchpad or the like.

Figure 2:
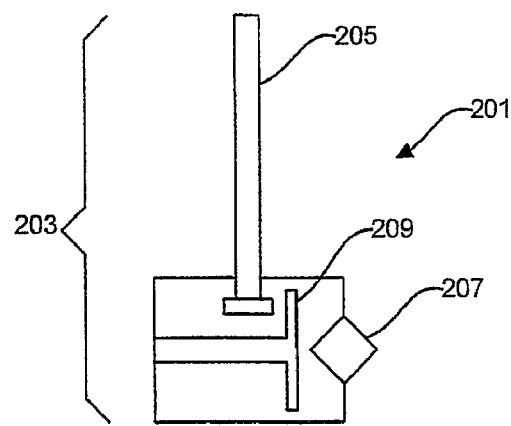
FIG. 2 illustrates an embodiment of a hybrid ultrasonic resonator and gigahertz radio frequency reflector according to the present invention.
Figure 3:
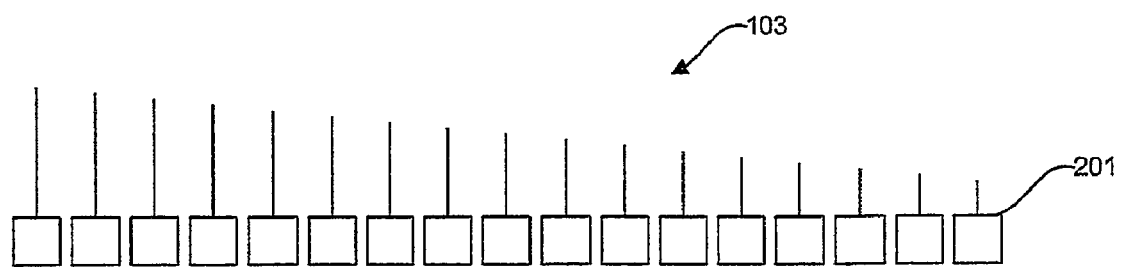
FIG. 3 illustrates an embodiment of an array of hybrid ultrasonic resonator and gigahertz radio frequency reflectors according to the present invention.

Referring to FIG. 2, an embodiment of a resonator reflector is designated generally by the number 201. As shown in FIG. 3, resonator/reflector array comprises a plurality of resonator/reflectors 201. Each resonator/reflector 201 comprises a microwave radio frequency resonator 203, which includes a microwave antenna 205, coupled to an ultrasonic resonator 207. Resonator/reflector 201 includes a tuning post 209. Radio frequency resonator 203 is sized and tuned to resonate and reflect or reradiate microwave signals at a selected frequency.

In one embodiment, each radio frequency resonator 203 is tuned to a unique frequency. Radio frequency resonators comprise full-wave resonator ranging from about 0.7 mm to about 1.0 mm, so as to be responsive to signals in the range from 460 GHz to about 300 GHz. Each radio frequency resonator 203 is constructed so as to have a narrow frequency response in the range of plus or minus about 4 GHz from its nominal response frequency. In the illustrated embodiment, radio frequency resonators 203 are tuned so as have response frequencies spaced about 10 GHz apart. When a radio frequency resonator 203 is exposed to a microwave signal having the appropriate frequency, it reradiates the signal.

Each ultrasonic resonator 207 is sized and tuned to resonate at a selected ultrasonic frequency. The resonant frequencies of ultrasonic resonators 207 are selected to range from about 45 KHz to about 125 KHz. Each ultrasonic resonator 207 is constructed so as to have a narrow frequency response in the range of plus or minus about 2 KHz from its nominal response frequency. In the illustrated embodiment, ultrasonic resonators 207 are tuned so as have response frequencies spaced about 5 KHz apart. The resonance of ultrasonic resonator is physically coupled to its associated radio frequency resonator 203. The physical coupling causes the size, and thus the frequency response, of radio frequency resonator to vary at the frequency of the ultrasonic resonator. Thus, the resonance of the ultrasonic resonator 207 modulates the radio frequency signal reflected by resonator/reflector 201 at the ultrasonic frequency.

In the illustrated embodiment, reflector/resonator array 103 comprises seventeen resonator/reflectors 201. Each radio frequency resonator 203 is tuned to a unique frequency within the range of microwave frequencies. Each ultrasonic resonator 207 is tuned to a frequency within the range of ultrasonic frequencies. The frequencies to which ultrasonic resonators 207 are tuned do not need to be unique. The resonator/reflectors 201 may be tuned according to the table of FIG. 4, in which the column represent radio frequencies and the rows represent ultrasonic frequencies. Each square in the table of FIG. 4 represents a unique pair of frequencies. Each pair of frequencies may be thought of as a digit. Since there are seventeen radio frequencies and for each radio frequency there may be seventeen ultrasonic frequencies, the illustrated embodiment may be used to encode identifiers as seventeen digit base-seventeen numbers. Accordingly, there are $17^{17}$ (about $8.27 \times 10^{20}$) possible numbers that can be encoded.

Those skilled in the art will recognized that other numbers and tunings of reflector/resonators 201 may be used. However, the 17×17 arrangement of the illustrated embodiment provides a vast number of unique identifiers. Also, given the range of frequencies, each reflector/resonator 201 has a footprint of about 1 mm×0.5 mm. Accordingly, reflector/resonator array 103 of the illustrated embodiment has a footprint of about 1 mm×about 10 mm.

Figure 5:
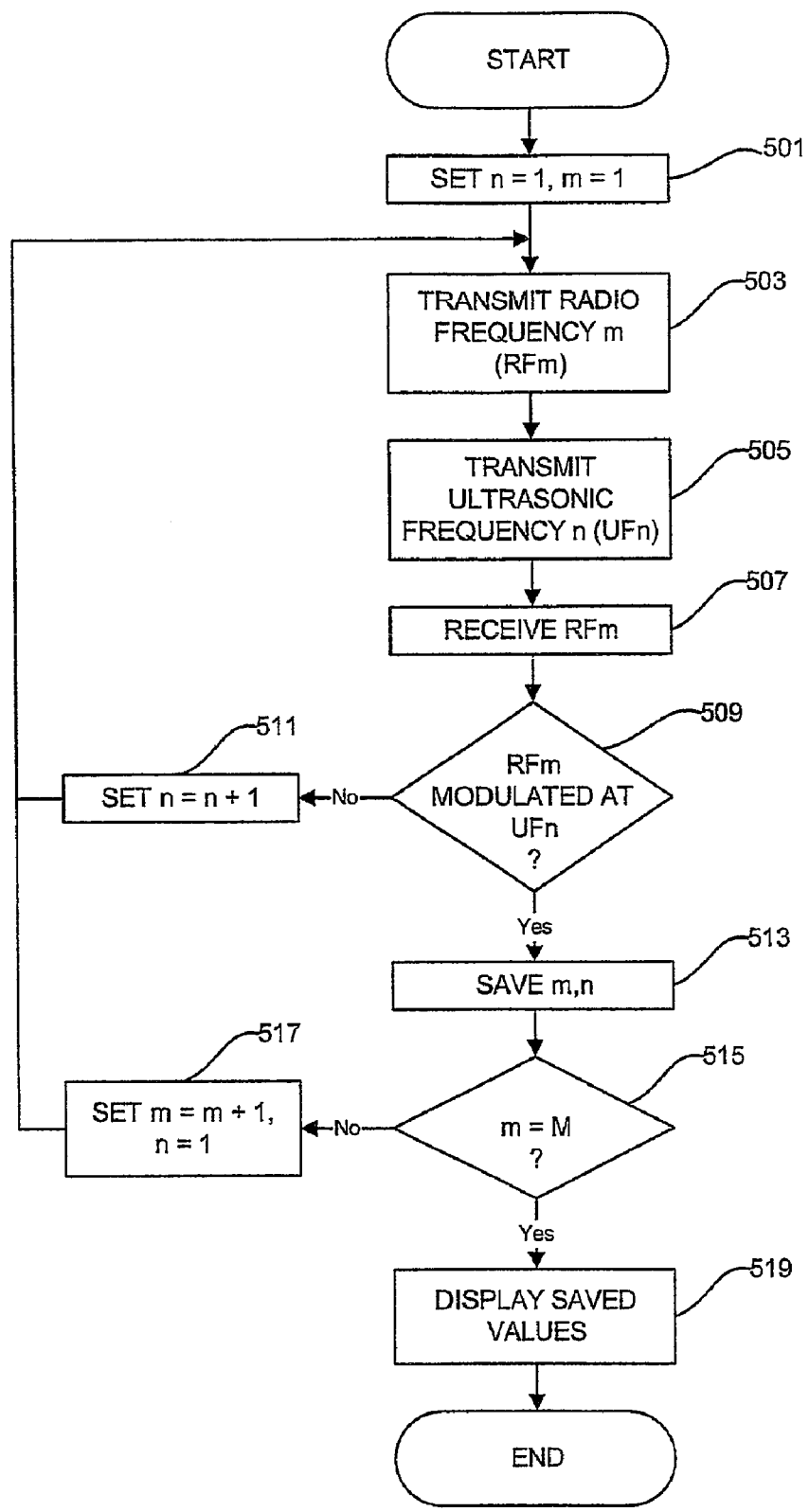

FIG. 5 is a flow chart of an embodiment of card reader processing according to the present invention. The card reader sets indices n and m equal to 1, at block 501. The card reader transmits radio frequency m (RFm), as indicated at block 503. Then the card reader transmits ultrasonic frequency n (UFn), as indicated at block 505. The card reader tunes its radio receiver to frequency RFm and receives RFm, as indicated at block 507. The card reader then tests, at decision block 509, if RFm is modulated at UFn. If not, the card reader sets index n equal to n+1, at block 511, and returns to block 503. If RFm is modulated at UFn, the card reader saves m and n, as indicated at block 513. Then, the card reader determines, at decision block 515, if m is equal to M, which is the number of radio frequencies. If not, the card reader sets index m equal to m+1 and index n equal to 1, at block 517, and returns to block 503. If m is equal to M, the card reader displays the saved values, at block 519, and processing ends. The card reader thus steps through each of the radio frequencies. At each radio frequency, the card reader steps through the ultrasonic frequencies until it finds that the radio frequency is modulated at a particular ultrasonic frequency.

The system of the present invention overcomes a number of shortcomings of the prior art. The tag of the present invention includes no integrated circuit. Accordingly, it is much less expensive to manufacture. The tag of the present invention is much smaller than the tags of the prior art. The reader of the present invention is much simpler than the readers of the prior art. It requires no complex signal processor.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A radio frequency identification system, comprising:
   a tag reader, including:
      an ultrasonic transducer configured to transmit tones at selected ultrasonic frequencies;
      a radio transmitter configured to transmit signals at selected radio frequencies;
      a radio receiver configured to receive signals at said selected radio frequencies; and
      a processor configured to determine if a received radio frequency signal is modulated at a selected ultrasonic frequency; and,
   a radio frequency identification tag, including: two or more combination resonator/reflectors, each of said combination resonator/reflector including an ultrasonic resonator coupled to a radio reflector to modulate a reflection of said radio reflector with a resonance of said ultrasonic resonator, wherein each of said combination resonator/reflector is tuned to a unique pair of selected ultrasonic frequencies and selected radio frequencies.

2. The system as claimed in claim 1, wherein said processor is further configured to step said radio receiver through said selected radio frequencies.

3. The system as claimed in claim 2, wherein said processor is further configured to step said ultrasonic transducer through a plurality of selected tones for each of said selected radio frequencies.

4. The system as claimed in claim 1, wherein: said selected radio frequencies range from about 300 GHz to about 470 GHz.

5. The system as claimed in claim 1, wherein: said selected ultrasonic frequencies range from about 45 KHz to about 130 KHz.

6. A radio frequency identification tag, comprising: two or more combination resonator/reflectors, wherein each of said combination resonator/reflector includes:
   a radio reflector; and
   an ultrasonic resonator coupled to said radio reflector to modulate a reflection of said radio reflector with a resonance of said ultrasonic resonator for detection by a reader, wherein each of said combination resonator/reflectors is tuned to a unique pair of selected ultrasonic frequencies and selected radio frequencies.

7. The radio frequency identification tag as claimed in claim 6, wherein: said selected radio frequencies range from about 300 GHz to about 470 GHz.

8. The radio frequency identification tag as claimed in claim 6, wherein: said selected ultrasonic frequencies range from about 45 KHz to about 130 KHz.

9. A method of identifying an article, comprising:
   associating with said article a radio frequency identification tag, said radio frequency identification tag including two or more combination resonator/reflector, each of said combination resonator/reflector including an ultrasonic resonator coupled to a radio reflector to modulate a reflection of the radio reflector with a resonance of the ultrasonic resonator, wherein each of said resonator/reflector is tuned to a unique pair of selected ultrasonic frequencies and selected radio frequencies;
   transmitting, from a tag reader, a tone having a first ultrasonic frequency to said radio frequency identification tag;
   transmitting, from said tag reader, a radio signal having a first radio frequency to said radio frequency identification tag; and
   determining, using said tag reader, if a radio signal having said first radio frequency is reflected from said radio frequency identification tag and if said reflected signal is modulated at said first ultrasonic frequency.

* * * * *